US010612514B2

United States Patent
Pricone et al.

(10) Patent No.: US 10,612,514 B2
(45) Date of Patent: Apr. 7, 2020

(54) RIGID POLYMERIC BLADE FOR A WIND TURBINE AND METHOD AND APPARATUS TO MANUFACTURE SAME

(71) Applicant: 10x Technology LLC, Libertyville, IL (US)

(72) Inventors: Robert M. Pricone, Libertyville, IL (US); John C. Nelson, The Sea Ranch, CA (US)

(73) Assignee: 10X TECHNOLOGY LLC, Libertyville, IL (US)

( * ) Notice: Subject to any disclaimer, the term of this patent is extended or adjusted under 35 U.S.C. 154(b) by 0 days.

(21) Appl. No.: 16/170,626

(22) Filed: Oct. 25, 2018

(65) Prior Publication Data

US 2019/0118419 A1    Apr. 25, 2019

Related U.S. Application Data

(60) Provisional application No. 62/576,942, filed on Oct. 25, 2017.

(51) Int. Cl.
*F03D 1/06* (2006.01)
*B29C 33/42* (2006.01)
*B29L 31/08* (2006.01)

(52) U.S. Cl.
CPC ......... *F03D 1/0641* (2013.01); *F03D 1/0675* (2013.01); *B29C 33/42* (2013.01); *B29L 2031/085* (2013.01); *F05B 2240/2212* (2013.01); *F05B 2250/11* (2013.01)

(58) Field of Classification Search
CPC . F03D 1/0641; B29C 33/42; B29L 2031/085; F05B 2250/11; F05B 2240/2212
See application file for complete search history.

(56) References Cited

U.S. PATENT DOCUMENTS

| | | | | |
|---|---|---|---|---|
| 5,133,516 A | * | 7/1992 | Marentic | B05D 5/02 244/130 |
| 5,295,530 A | | 3/1994 | O'Connor et al. | |

(Continued)

FOREIGN PATENT DOCUMENTS

| | | | | |
|---|---|---|---|---|
| WO | WO-8911343 A2 * | 11/1989 | | B05D 3/12 |
| WO | 2015012752 A9 | 1/2015 | | |
| WO | WO-2017178756 A1 * | 10/2017 | | B29C 45/263 |

OTHER PUBLICATIONS

WO-2017178756-A1 Machine Translation. Accessed EPO Website Apr. 8, 2019. pp. 5. (Year: 2019).*

(Continued)

*Primary Examiner* — Richard A Edgar
(74) *Attorney, Agent, or Firm* — Medley, Behrens & Lewis, LLC; Nathan T. Lewis

(57) ABSTRACT

In an embodiment, a molding apparatus for a turbine blade includes first and second mold compartments defining a mold cavity when in a closed position, at least one of the first and second mold compartments including a micro-structured surface facing an interior of the mold cavity. The micro-structured surface includes an array of V-shaped channels, and the V-shaped channels have a maximum height of 200 micrometers. A turbine blade including integral micro-structured riblets and method for making the turbine blade is also provided.

4 Claims, 3 Drawing Sheets

(56) References Cited

U.S. PATENT DOCUMENTS

| | | | | |
|---|---|---|---|---|
| 5,337,568 | A * | 8/1994 | Lee | F01D 5/18 416/236 R |
| 6,264,877 | B1 * | 7/2001 | Pallu De La Barriere | B29C 70/446 264/258 |
| 8,603,628 | B2 * | 12/2013 | Verma | F03D 1/065 427/393.5 |
| 9,067,865 | B2 * | 6/2015 | Klein | C07C 213/02 |
| 9,268,215 | B2 * | 2/2016 | Nielsen | B82Y 10/00 |
| 10,113,069 | B2 * | 10/2018 | Saito | C09D 167/00 |
| 2013/0062004 | A1 * | 3/2013 | Amirehteshami | B29C 70/78 156/245 |
| 2014/0010654 | A1 * | 1/2014 | Fajardo | F01D 7/00 416/147 |
| 2014/0163717 | A1 | 6/2014 | Das et al. | |
| 2017/0369664 | A1 * | 12/2017 | Brown | C08J 7/065 |
| 2018/0319044 | A1 * | 11/2018 | Lanfant | B29C 33/42 |

OTHER PUBLICATIONS

PCT Patent Office, "International Search Report and Written Opinion for PCT Patent Application No. PCT/US2018/057512", dated Jan. 31, 2019, 7 pages.

Sareen, et al., "Drag Reduction Using Riblet Film Applied to Airfoils for Wind Turbines", In 49th AIAA Aerospace Sciences Meeting Including the New Horizons Forum and Aerospace Exposition, Jan. 4, 2011, pp. 1-19.

Sareen, Agrim, "Drag Reduction Using Riblet Film Applied to Airfoils for Wind Turbines", University of Illinois at Urbana-Champaign Master of Science in Aerospace Engineering Thesis, 2012, 255 pages.

* cited by examiner

RIGID POLYMERIC BLADE FOR A WIND TURBINE AND METHOD AND APPARATUS TO MANUFACTURE SAME

CROSS-REFERENCE TO RELATED APPLICATIONS

The application claims the benefit of priority to U.S. provisional application 62/576,942, filed on Oct. 25, 2017, which is herein incorporated by reference.

TECHNICAL FIELD

This technology relates to turbine structures. More particularly, it relates to micro-structures on wind turbine blades.

SUMMARY

In an embodiment, a molding apparatus for a turbine blade comprises first and second mold compartments defining a mold cavity when in a closed position, at least one of the first and second mold compartments including a micro-structured surface facing an interior of the mold cavity. The micro-structured surface includes an array of V-shaped channels, and the V-shaped channels have a maximum height of 200 micrometers.

In an embodiment, a turbine blade comprises a major axis running along a longest dimension of the turbine blade, and the turbine blade has integrally-formed riblets having a maximum height of 200 micrometers on the surface of the turbine blade.

In an embodiment, a method for making a turbine blade includes forming a micro-structured surface onto at least one of the first or second mold compartments. The first and second mold compartments defining a mold cavity for the turbine blade when in a closed position. The micro-structured surface includes an array of V-shaped channels, the V-shaped channels having a maximum height of 200 micrometers. The method further comprises flowing monomer or liquid polymer into the mold cavity, polymerizing or curing the monomer or liquid polymer in the mold cavity to form a turbine blade with a micro-structured riblet surface; and removing the turbine blade with a micro-structured riblet surface from the mold cavity.

BACKGROUND AND DETAILED DESCRIPTION

Figure 1:
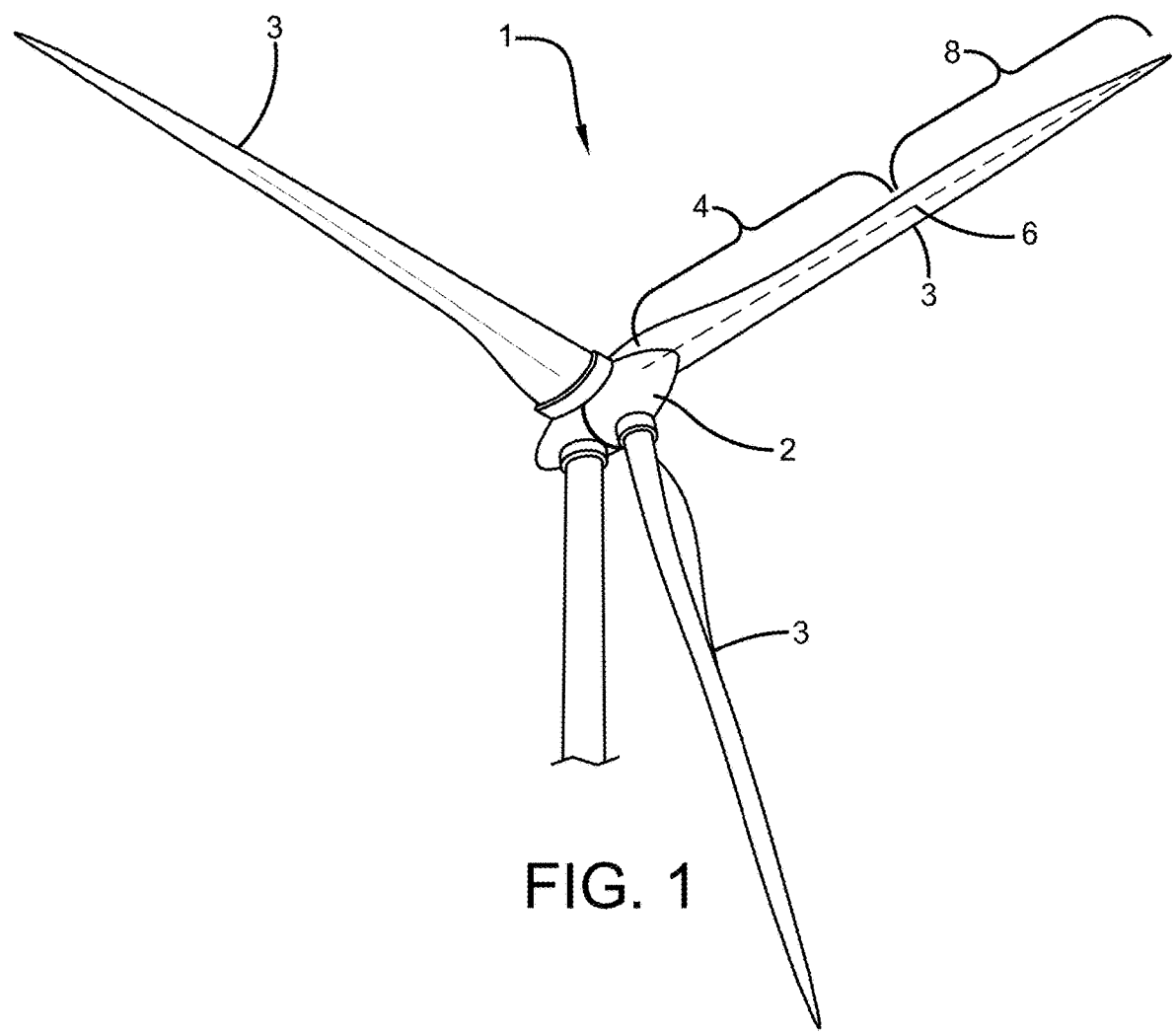
FIG. 1 is a perspective view of a wind turbine.

FIG. 1 depicts a wind turbine 1 that includes a hub 2 and multiple blades 3. Wind turbine blades are typically molded from polyester or carbon fiber-reinforced composites. The blade diameter of offshore turbines can reach 170 meters (557 feet), such as, for example, 100 feet to 450 feet, or 200 feet to 300 feet. Blade diameter in this case refers to the full diameter of the circle in which the outer edges of the wind turbine blades travel.

Riblet film that comprises or consists of various shape and size V-shape grooves can reduce skin friction drag when applied to an aerodynamic surface, such as surfaces on aircraft. Numerous studies have been done to determine the optimal riblet configurations to increase the efficiency of wind turbine blades. One example of this is a thesis submitted by Agrim Sareen titled "Drag Reduction Using Riblet Film Applied to Airfoils for Wind Turbines," at the Graduate College of the University of Illinois at Urbana-Champaign on this subject in 2012, which is incorporated herein by reference. See also, Agrim Sareen, et al., "Drag Reduction Using Riblet Film Applied to Airfoils for Wind Turbines," 49th AIAA Aerospace Sciences Meeting including the New Horizons Forum and Aerospace Exposition 4-7 Jan. 2011, Orlando, Fla., incorporated herein by reference. Any distances or other numeric values disclosed therein may be generalized herein to have a range of 25 to 300%, such as 50% to 200%, or 75% to 150%.

Although the concept of applying variously shaped and sized V-shape grooved film to the surface of wind turbine blades has been suggested, there are problems with adhesion of the film to the blade surface and replacement cost if the film peels away. This is especially a problem if the wind farm is in a remote area or in the ocean. In contrast, the technology described herein provides methods for forming the riblet structure directly into the turbine blade when it is manufactured.

Wind turbine blades are currently manufactured by casting a thermoset polymer, such as epoxy, vinyl ester, or polyester combined with 70% to 75% glass fiber by weight into a mold. There is also interest in carbon fiber, which can provide improved stiffness and reduced weight. After the polymer cures, the blade is removed from the mold and inspected for quality.

In an embodiment, including riblet film in the mold that produces the blade can replicate the structures directly into the blade when it is manufactured. In an embodiment, the micro-structured surface is of the same composition as the majority of the turbine blade. In some cases, the riblet film in the mold could remain on the blade, being removed along with the blade that is removed from the mold, to protect the surface during transportation and installation and then be removed just after installation is complete.

Figure 2:
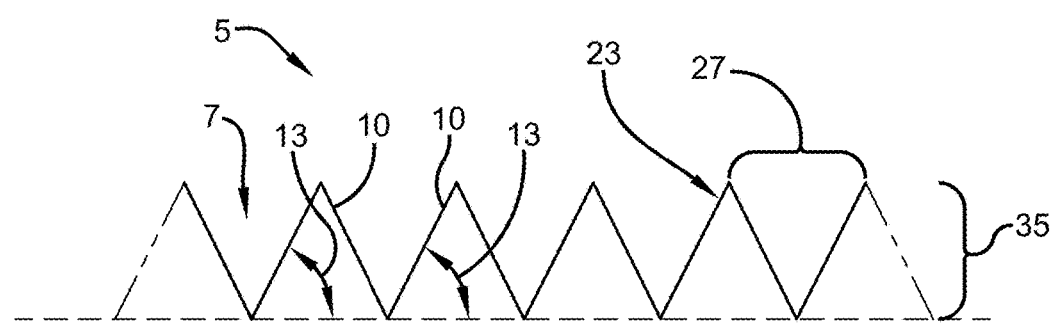
FIG. 2 is diagram of an array of riblets.

FIG. 2 shows a diagram of an array of riblets 5 that would be on the polymeric wind turbine outer surface. The space between the riblets 5, may be referred to as a channel 7 as disclosed herein. The riblets are precision micro-structures and may have any or all of the following characteristics: precise depths; flat surfaces with precise angular orientation; fine surface smoothness; sharp angular features; and precise dimensions of the elements and/or precise separation of the elements. The nature and dimensions of the formed surface affects the functional attributes of the molded products.

The precision of the channels on the blade is a function of both the geometry of the molding tool and manufacturing techniques. In an embodiment, the riblets may be imparted into the surface of the blade by coating the mold with a film the comprises riblets of generally the same (but inverse) geometry as what is desired to be molded into the blade. In some embodiments, the film may be removed from the mold with the blade and stay on the blade as a protective film, until the blade is transported from the factory and put into service on the turbine. In another embodiment, the mold itself may integrally and permanently have the riblets disposed on it.

The riblets may have one or more of the following characteristics:

(a) flat surfaces 10 with angular slopes 13 controlled to a tolerance of 5 minutes relative to a reference value, more preferably a tolerance of 2 minutes relative to a reference value; or to at least 99.9% of the specified value;

(b) precisely formed (i.e., very smooth) surfaces with a roughness of less than 100 Angstroms rms relative to a reference surface, such as 75 to 5 Angstroms rms, or 60 to 25 rms, more preferably with a roughness configuration closely matching that of less than 50 Angstroms rms relative to a reference surface. This allows for low friction and minimal surface drag, resulting in smooth continuous non-diffusive flow, allowing the fluid flowing laminar. Surface roughness may be determined by ISO 10110-8;

(c) having angular acute features with an edge radius (sharpness) 23 and/or corner radius of curvature of less than 0.001 inches (25 microns), such as 20 to 1 micron, or 15 to 5 microns, and controlled to less than 0.1% of deviation, such as 0.05 to 0.005%, or 0.01 to 0.0001% of deviation;

(d) precisely controlled dimensions within the plane of the sheeting, in terms of the configuration of individual riblet elements, and/or the location of multiple elements relative to each other or a reference point;

(e) very sharp points and sharp ridges (less than 0.00028 inches (7 microns), such as 1 to 6 microns, or 2 to 5 microns.

(f) the riblets may have 90% or greater accuracy, such as 93% to 99.5% or 95% to 98% of the cross-sectional area being conserved through the length of channel; and from channel to channel, in which dimensions range from 0.00020 to 0.008 inches (5-200 microns) depth, such as 10 to 150 microns, or 20 to 100 microns; and 0.00020 inches to 10 inches (5 microns to 25.4 cm) width (peak-to-peak) 27, such as 15 microns to 15 cm, or 100 microns to 1 cm, or 50 to 90 microns. The riblets may have a length of 0.1 to 20 feet, such as, 1 to 5 feet, or 1.2 to 3 feet.

In embodiments, the riblets may be in a consistent pattern of nearly identical depths and widths. In others, some or all portions of the riblets may be formed with patterns of varying depths or varying widths. In some embodiments, one or more riblets may be omitted between channels and filled in with a flat space between the peaks of the outlying riblets. Typically, the riblets are arranged in a repetitive pattern; but the blade may also have non-repetitive arrays.

Referring to FIG. 1 again, in an embodiment, the turbine blade has a major axis running length-wise from base to tip and the riblet array runs generally transverse to the major axis. In an embodiment, this riblet array runs in a range of plus or minus 20 degrees, 10 degrees, or 5 degrees from perpendicular to the major axis of the blade. The riblet array may be disposed on an upper portion 8, lower portion 4, or both an upper and lower portion 8, 4 of the blade 3. In an embodiment, the riblet array 5 is disposed on the trailing edge of the blade 3, i.e. the most severely tapered edge that is to be installed facing away from the prevailing wind. In contrast to prior suggested solutions, the turbine blade is exclusive of a film layer.

In an embodiment, the riblet arrays are arranged and dimensioned as disclosed in Agrim Sareen, et al., "Drag Reduction Using Riblet Film Applied to Airfoils for Wind Turbines," 49th AIAA Aerospace Sciences Meeting including the New Horizons Forum and Aerospace Exposition 4-7 Jan. 2011, Orlando, Fla., incorporated herein by reference. The application of riblets is made primarily, in some cases exclusively, to the turbulent zone of the turbine blade to reduce drag on the trailing edge of the blade. The arrangements may be varied based on size, Reynolds number, and normal angle of attack. In general, the larger the riblet size, i.e, width, the optimal Reynold's number is smaller. The normal angle of attack may be 0 to 20 degrees, such as 2 to 12 degrees, or 4 to 8 degrees. In an embodiment, the height of the riblet peaks 35 and the peak-to-valley distance is within plus or minus 10%, such as plus or minus 5%, or plus or minus 1% of each other.

Figure 3:
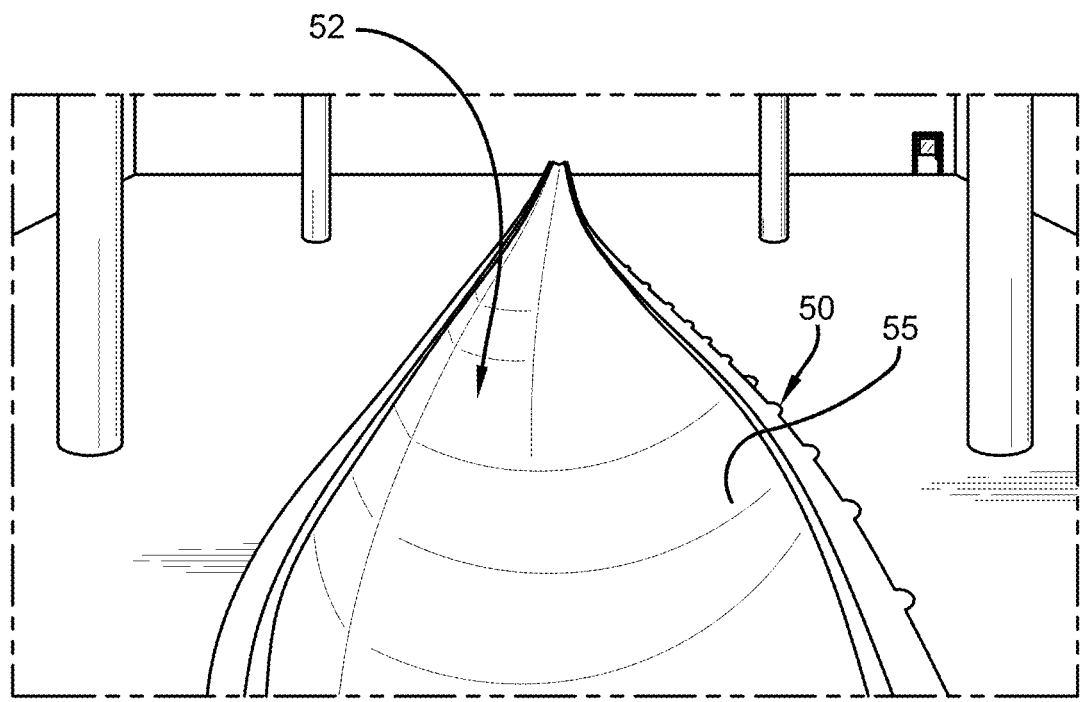
FIG. 3 is a perspective view of a typical mold for a wind turbine blade.
Figure 4:
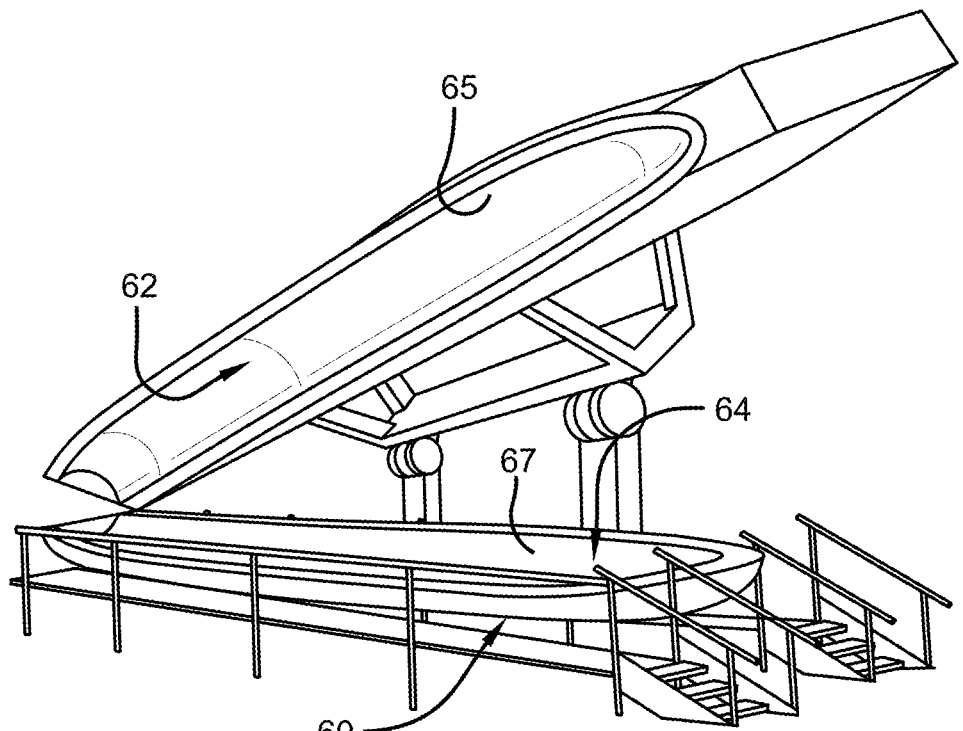
FIG. 4 is a perspective view of the upper and lower sections of a mold for a wind turbine blade.

FIG. 3 and FIG. 4 show molding tools 50, 60 for turbine blades with micro-structured surfaces. The FIG. 3 molding tool 50 is a single sided tool with a first mold compartment 52, a top mold compartment (not shown) would be laid over the first mold compartment 52 to close the molding tool 50. The FIG. 4 molding tool 60 is an open and closeable two-sided mold, including first 62 and second 64 mold compartments. In the molds 50, 60, the riblet pattern is molded into a turbine blade and the pattern is an inverse pattern of a predetermined geometric pattern that is replicated from the molding tools 50, 60 from an inverse pattern on a micro-structured surface 55, 65, 67 on the mold compartments 52, 62, 64. In an embodiment, the tools or molds 50, 60 are produced from electroformed masters that permit the creation of precisely designed structures, e.g. riblet arrays. The pattern of riblets may be those disclosed above.

In an embodiment, the first and second mold compartments 62, 64 define a mold cavity when in a closed position. At least one of the first and second mold compartments 62, 64 include a micro-structured surface 65 and/or 67 facing an interior of the mold cavity, wherein the micro-structured surface 65/67 includes an array of V-shaped channels.

In an embodiment, the apparatus disclosed herein is a modification to an otherwise conventional molding apparatus and molding production line. The mold can be formed with tooling in a manner that imprints the inverse of the riblet features desired for the blade into the mold itself. Alternatively, a film is formed with the V-shaped features and the film is applied to, e.g., adhered to, the interior of the mold. In an embodiment, the Tg of the riblet imprinting film or features on the mold is higher than the Tg of the polymerized material of the blade, such as 1° C. to 200° C. greater, or 10° C. to 100° C. greater. In an embodiment, the film is retained on the molded blade until both blade and film are removed from the mold. In an embodiment, the Tg of the film is higher than the Tg of the polymeric material of the blade.

In an embodiment, a container is in fluid communication with one or more of the first and second mold compartments. The container is configured to introduce a liquid monomer, curing agent or liquid polymer to said mold cavity for polymerization therein. Separate containers may be used for curing agent and monomer/liquid polymer.

The apparatus also includes a heat or radiation source to polymerize or cure the monomer or polymer in the mold cavity. Various additional features may be included with the apparatus to promote removal of the molded blade from the mold cavity. For example, pushing elements in the mold can be used to push the blade out of the mold, or a non-stick coating or release agent can be applied to the mold prior to introduction of the polymer/monomer.

Figure 5:
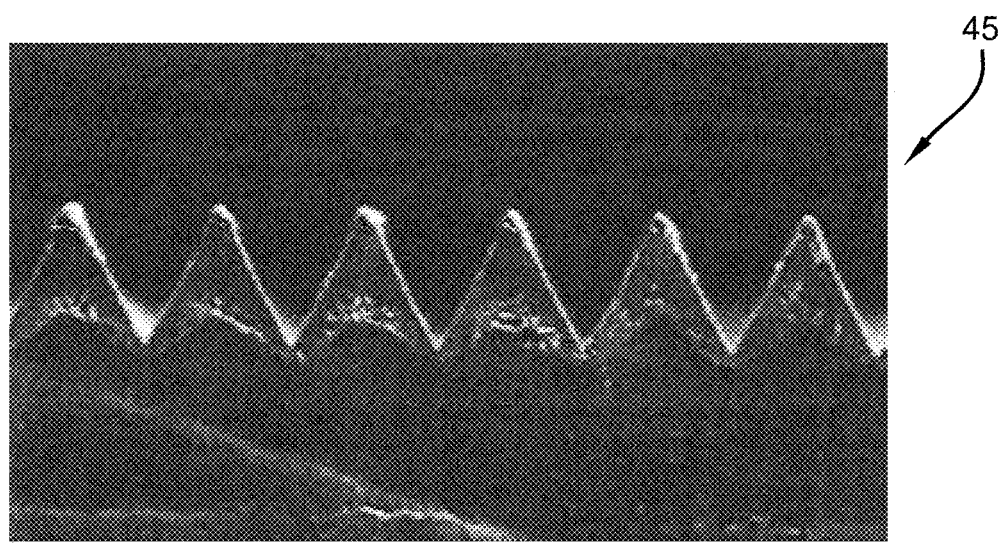
FIG. 5 is a micrograph showing a cross-sectional view of V-shaped riblets on a film that can be used to coat a mold for a turbine blade and imprint channels onto a molded turbine blade.

Presented herein is a method to put micro-sized channels (or riblets) in turbine blades. In the method, the turbine mold 50, 60 has micro-structured V-shaped channels. The mold 50, 60 is filled with a monomer or liquid polymeric resin and polymerized or otherwise cured. The monomer or liquid polymeric resin fills the mold 50,60 including the V-shaped channels. The resulting turbine blade has riblets such as those shown in FIG. 2 molded into its outer surface. FIG. 5 is a micrograph showing an array of riblets 45 formed into a polymeric material such as would be used to imprint the inverse riblets into a turbine blade.

The method includes forming a micro-structured surface onto at least one of the first or second mold compartments. The first and second mold compartments defining a mold cavity for the turbine blade when in a closed position. The micro-structured surface includes an array of V-shaped channels, the V-shaped channels having a maximum height of 200 micrometers. The method further comprises flowing monomer or liquid polymer into the mold cavity, polymerizing or curing the monomer or liquid polymer in the mold cavity to form a turbine blade with a micro-structured riblet surface; and removing the turbine blade with a micro-structured riblet surface from the mold cavity.

In an embodiment, a halogenated polyolefin polymer is used as the turbine blade material. For example, the polyolefin may be one or more of ethylene or propylene, and the halogen can be one or more of chlorine, bromine, or fluorine. In an embodiment, a copolymer of ethylene and chlorotrifluoroethylene, such as ECTFE poly(ethylene-chlorotrifluoroethylene) is the material used to form the turbine blade. One example of ECTFE is the fluorinated polyolefin with the trade name HALAR. The halogenated polymer has extremely good release and does not require the use of a release agent to cleanly and effectively release from the mold. In an embodiment, the halogenated polyolefin polymer has a Tg over 200° C., such as 220° C. to 400° C., or 230° C. to 280° C.

In an embodiment, the halogenated monomers and/or olefin monomer may be copolymerized with certain other thermoplastic monomers, such as, for example, acrylates, so long as the material can be imprinted with the features and the Tg is in an acceptable range for the molding process, such as 90 to 200° C., 95° C. to 180° C., or 100° C. to 150° C.

Fillers, such as glass fibers and other materials may also be used in the turbine material. Other conventional additives may also be included. The filler material should be of a nature and amount that is compatible with imprinting the riblets into the material.

In an embodiment, the riblets may be formed by electroforming. Electroforming is a method to electro-deposit metal, such as nickel, ion by ion to accurately provide a copy of a structured substrate called a mandrel. The electroformed copy of the mandrel is the negative gender and can be used as a mold to provide the positive copy of the mandrel or original part. In this case, electroforming can be used to form a metal V-channel substrate that is used as the film that is applied to the turbine mold.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

The invention claimed is:

1. A wind turbine blade comprising:
a major axis running along a longest dimension of the wind turbine blade;
integrally-formed riblets having a maximum height of 200 micrometers on the surface of the wind turbine blade;
wherein the integrally-formed riblets are polymeric and are of the same composition as a majority of the wind turbine blade;
wherein the wind turbine blade is configured to have a blade diameter of 100 feet to 557 feet;
wherein the wind turbine blade comprises a halogenated polyolefin polymer with a Tg over 200° C.

2. The wind turbine blade of claim 1, wherein the riblets run perpendicular to the major axis of the blade plus or minus 20 degrees.

3. The wind turbine blade of claim 2, wherein the wind turbine blade is exclusive of a film layer.

4. The wind turbine blade of claim 2, wherein the riblets have peaks and valleys and the peak-to-valley distance is within plus or minus 10% of each other.

* * * * *